(12) United States Patent
Trolat et al.

(10) Patent No.: US 11,042,995 B2
(45) Date of Patent: Jun. 22, 2021

(54) ADAPTIVE SYSTEM AND METHOD FOR AUTOMATIC TRACKING OF AT LEAST ONE TARGET IN AT LEAST ONE VIDEO STREAM

(71) Applicant: BULL SAS, Les Clayes-sous-Bois (FR)

(72) Inventors: Florent Trolat, Izeaux (FR); Sophie Guegan-Marat, Seyssinet-Pariset (FR)

(73) Assignee: BULL SAS, Les Clayes-sous-Bois (FR)

( * ) Notice: Subject to any disclaimer, the term of this patent is extended or adjusted under 35 U.S.C. 154(b) by 95 days.

(21) Appl. No.: 16/227,213

(22) Filed: Dec. 20, 2018

(65) Prior Publication Data

US 2019/0197706 A1 Jun. 27, 2019

(30) Foreign Application Priority Data

Dec. 26, 2017 (FR) .................................. 1763231
Jan. 19, 2018 (FR) .................................. 1850437

(51) Int. Cl.
   *G06T 7/292* (2017.01)
(52) U.S. Cl.
   CPC .... *G06T 7/292* (2017.01); *G06T 2207/10016* (2013.01); *G06T 2207/20004* (2013.01); *G06T 2207/30232* (2013.01)
(58) Field of Classification Search
   CPC ........... G06T 7/292; G06T 2207/10016; G06T 2207/20004; G06T 2207/30232
   See application file for complete search history.

(56) References Cited

U.S. PATENT DOCUMENTS

| | | | |
|---|---|---|---|
| 2007/0024706 A1* | 2/2007 | Brannon, Jr. | ...... H04N 21/4223 348/142 |
| 2011/0128374 A1* | 6/2011 | Shellshear | ............... H04N 7/18 348/135 |

OTHER PUBLICATIONS

Search Report as issued in French Patent Application No. 1850437, dated Nov. 28, 2018.
Liu, R., et al., "Online Determination of Track Loss Using Template Inverse Matching," The Eighth International Workshop on Visual Surveillance, Oct. 2008, XP055526572, 9 pages.
Korshunov, P., et al., "Critical Video Quality for Distributed Automated Video Surveillance," 13th Annual ACM International Conference on Multimedia, Nov. 2005, XP058250012, 10 pages.

(Continued)

*Primary Examiner* — Utpal D Shah
(74) *Attorney, Agent, or Firm* — ARC IP Law, PC; Joseph J. Mayo

(57) ABSTRACT

A system includes at least one dynamically configurable tracking device, receiving a video stream and, adapted for detection and automatic tracking of at least one target by analysis of the video stream; a calculator of a metric performance value starting from a target tracking result supplied by the tracking device; a configuration parameter corrector of the tracking device as a function of the metric performance value; and a dynamic configurator of the tracking device by applying the corrected configuration parameter. It further includes a supplementary reference tracking device, receiving at least one portion of the video stream, and the calculator calculates the metric performance value from a comparison on the video stream portion, of the target tracking result supplied by the tracking device and a reference tracking result supplied by the supplementary reference tracking device.

7 Claims, 2 Drawing Sheets

(56) References Cited

OTHER PUBLICATIONS

Igual, R., et al., "Adaptive tracking algorithms to improve the use of computing resources," IET Computer Vision, vol. 7, No. 6, Dec. 2013, XP055510200, pp. 415-424.

Dieber, B., et al., "Resource-Aware Coverage and Task Assignment in Visual Sensor Networks," IEEE Transactions on Circuits and Systems for Video Technology, Institute of Electrical and Electronics Engineers, vol. 21, No. 10, Oct. 2011, XP011361151, 15 pages.

\* cited by examiner

ADAPTIVE SYSTEM AND METHOD FOR AUTOMATIC TRACKING OF AT LEAST ONE TARGET IN AT LEAST ONE VIDEO STREAM

CROSS-REFERENCE TO RELATED APPLICATIONS

This application claims priority to French Patent Application No. 1763231, filed Dec. 26, 2017 and French Patent Application No. 1850437, filed Jan. 19, 2018, the entire contents of which are incorporated herein by reference in their entirety.

FIELD

This invention relates to an adaptive system for automatic tracking of at least one target in at least one video stream. It also relates to a corresponding method and computer program.

"Target" means a detectable object or a human or animal living being, to be automatically tracked in the video stream(s) using known methods that can be implemented by micro-programming or micro-wiring in the tracking device that is itself a computer or electronic device. In other words, the target is the object or living being to be situated in real time in space and time from a perception of a scene provided by one or several video cameras.

Application fields include detection and automatic tracking in real time of a target in a video stream, detection and automatic tracking of a target in several video streams supplied in parallel by several cameras (function generally referred to as "real time multi-target tracking"), but also detection and automatic tracking of several targets in several video streams supplied in parallel by several cameras (function generally referred to as "real time multi-target multi-camera tracking").

BACKGROUND

Multi-target multi-camera tracking in particular is a complex operation requiring the use of sophisticated algorithms generating a large quantity of calculations. It requires the combined and simultaneous use of several electronic components such as CPUs (Central Processing Units), electronic chips specialized in video decoding, graphic processors or GPUs (Graphic Processing Units), etc. Furthermore, algorithms used in the multi-target multi-camera tracking processing chain have a large number of configuration parameters that have an influence on tracking quality and demand on hardware resources.

Furthermore, a very large number of cameras are also frequently used in the field of video surveillance: for example several hundred cameras in closed public places, and up to several thousand or tens of thousands outdoors. A continuous optimization of the compromise between tracking quality and demand on hardware resources then becomes essential, otherwise calculation costs would quickly become prohibitive.

Furthermore, dynamic sharing of hardware resources becomes a major challenge in a context of versatility of these resources. For example, priority can be given at each instant to tracking of a particular target, and even temporarily reducing the quality of other tracking. In order to achieve this flexibility, it must be possible to continuously adapt tracking so that it functions with predetermined optimization aimed at reducing the demand on hardware resources while maintaining a certain quality level.

An adaptive system for automatic tracking of a target in at least one video stream is for example envisaged in the paper by Igual et al, entitled "Adaptive tracking algorithms to improve the use of computing resources", published in IET Computer Vision, volume 7, No. 6, pages 415 to 424 (2013). It is designed to detect tracking risk situations, in other words situations in which the tracking device(s) is or are liable to make detection or tracking errors, to automatically adapt calculation capacities (i.e. demand on hardware resources) or to change the tracking algorithm. To achieve this, it is capable of calculating at least one metric performance value starting from a target tracking result supplied by the tracking device(s) and making use of it to dynamically adapt its configuration parameters.

But detection of risk situations is not a problem that can be solved easily and the method described in the paper by Igual et al cited above is not fully satisfactory. It generates a certain number of uncertainties about its reliability.

SUMMARY

It may thus be desirable to design an adaptive system for automatic target tracking in at least one video stream capable of overcoming at least some of the above mentioned problems and constraints.

Therefore, in an aspect of the invention, an adaptive system for automatic tracking of a target in at least one video stream is proposed, comprising:
  at least one dynamically configurable tracking device receiving the at least one video stream, adapted for detection and automatic tracking of at least one target by analysis of the at least one video stream,
  a calculator to determine at least one metric performance value from a target tracking result provided by the at least one tracking device,
  a corrector of at least one configuration parameter of the least one tracking device as a function of the at least one metric performance value,
  at least one dynamic configurator of the at least one tracking device by application of the at least one corrected configuration parameter, and
  at least one supplementary reference tracking device, receiving at least one portion of the at least one video stream,
the calculator being adapted more precisely to calculate the at least one metric performance value based on a comparison on the at least one video stream portion, of the target tracking result supplied by the at least one tracking device and a reference tracking result supplied by the at least one supplementary reference tracking device.

Thus, risk situations are detected much more reliably and the resulting optimization of hardware resources largely compensates the extra cost generated by the addition of the reference tracking device(s).

Optionally, an adaptive automatic target tracking system according to an embodiment of the invention may further comprise at least one video capture device connected in data transmission to the at least one tracking device and to the at least one supplementary reference tracking device, for the respective supply of the at least one video stream and the at least one portion of the at least one video stream.

Also optionally, each tracking device can be configured using at least one of the configuration parameters of the set composed of:

a number of images to be processed or interpreted per second in the at least one video stream,
an image resolution, and
a maximum number of targets to be detected and tracked in the at least one video stream.

Also optionally, the calculator is more precisely adapted to calculate the at least one metric performance value based on a number of unidentified or lost targets for each tracking device, this number being calculated from the comparison on the at least one video stream portion, of the target tracking result supplied by the at least one tracking device and the reference tracking result supplied by the at least one supplementary reference tracking device.

Also optionally, the calculator is more precisely adapted to calculate the at least one metric performance value based on a number of interchanged or badly localized targets for each tracking device, this number being calculated from the comparison on the at least one video stream portion, of the target tracking result supplied by the at least one tracking device and the reference tracking result supplied by the at least one supplementary reference tracking device.

Also optionally, the corrector is adapted to regulate a set frequency of the at least one tracking device by applying at least the following rules:
  if the number of unidentified or lost targets added to the number of interchanged or badly localized targets is higher than a predetermined set quality, for example increased by a predetermined tolerance value, then the set frequency of the at least one tracking device is increased, and
  if the number of unidentified or lost targets added to the number of interchanged or badly localized targets is lower than the predetermined set quality, for example reduced by the predetermined tolerance value, then the set frequency of the at least one tracking device is reduced.

Also optionally, an adaptive automatic target tracking system according to an embodiment of the invention may comprise several tracking devices, simultaneously receiving respectively several video streams.

Also optionally, each tracking device is adapted for detection and simultaneous automatic tracking of several targets by analysis of the video stream that it receives.

In an aspect of the invention, an adaptive method for automatic tracking of a target in at least one video stream is also proposed, comprising the following steps:
  analyze the at least one video stream using at least one dynamically configurable tracking device adapted for detection and automatic tracking of at least one target in the at least one video stream,
  calculate at least one metric performance value from a target tracking result provided by the at least one tracking device,
  correct at least one configuration parameter of the least one tracking device as a function of the at least one metric performance value, and
  dynamic configuration of the at least one tracking device by application of the at least one corrected configuration parameter,
the method further comprising the supply of at least one portion of the at least one video stream to at least one supplementary reference tracking device, and the at least one metric performance value being calculated more precisely from a comparison, on the at least one video stream portion, of the target tracking result supplied by the at least one tracking device and a reference tracking result supplied by the at least one supplementary reference tracking device.

In an aspect of the invention, a computer program that can be downloaded from a communication network and/or saved on a non-transitory computer readable medium or support that can be read by a computer and/or executed by a processor is also proposed, comprising machine readable instructions for the execution of steps in an adaptive method for automatic target tracking in at least one video stream according to the invention, when the program is run on a computer.

BRIEF DESCRIPTION OF THE DRAWINGS

The invention will be better understood with reference to the following description, given purely as an example, with reference to the appended drawings in which.

DETAILED DESCRIPTION

Figure 1:
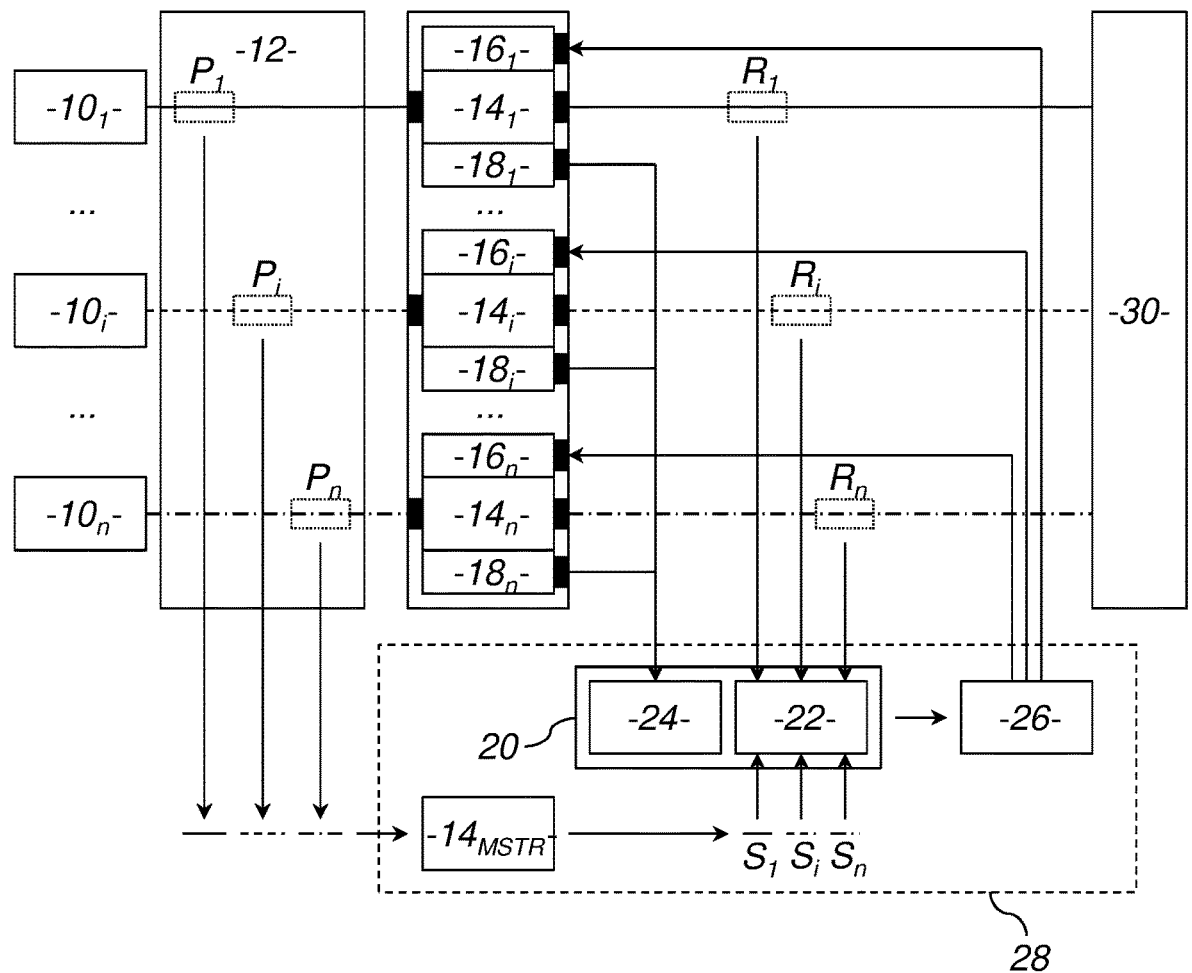
FIG. 1 diagrammatically represents the general structure of an adaptive system for automatic target tracking in at least one video stream, according to an embodiment of the invention.

The adaptive automatic target tracking system in FIG. 1 comprises at least one video capture device for the supply of at least one video stream. In the non-limitative example illustrated, it comprises n, more precisely n video cameras $10_1, \ldots, 10_i, \ldots, 10_n$ for the supply of n video streams. Each of them films a scene and transmits the corresponding video stream through a computer connection.

It further comprises a collector 12 of the n video streams to transmit them to a primary stage of tracking devices adapted for detection and automatic tracking of at least one target by analysis of video streams that they respectively receive.

In the example illustrated, the primary stage comprises:
  n tracking devices $14_1, \ldots, 14_i, \ldots, 14_n$ for respective processing of the n video streams output from the n video cameras $10_1, \ldots, 10_i, \ldots, 10_n$, and transmitted by the collector 12, and
  according to a first aspect of this invention, a supplementary reference tracking device $14_{MSTR}$ for processing of respective portions of the n video streams output from the n video cameras $10_1, \ldots, 10_i, \ldots, 10_n$, these portions being selected and transmitted by the collector 12.

Each of the n tracking devices $14_1, \ldots, 14_i, \ldots, 14_n$ is for example capable of detecting and simultaneously tracking several targets in real time that can be seen in the video stream that it receives. Such devices (hardware and software) are well known in prior art and will not be described further. They can be configured dynamically using one or several parameters that influence their consumption of hardware resources, their performances and the quality of their target tracking results: for example, a number of images to be processed or interpreted per second in the video stream, an image resolution, a maximum number of targets to be detected and tracked in the video stream, etc. The dynamic configuration consists of being able to modify these configuration parameters during execution. To achieve this, they are associated with n dynamic configurators $16_1, \ldots, 16_i, \ldots, 16_n$ respectively that are designed in hardware or programmed in software to store, adjust and dynamically apply these configuration parameters.

According to a second aspect of this invention, they are also associated with n measurement devices $18_1, \ldots, 18_i, \ldots, 18_n$ respectively that are designed by hardware or programmed by software to measure one or several values representative of a demand for or use of hardware resources by the n tracking devices $14_1, \ldots, 14_i, \ldots, 14_n$. These values may comprise an operating frequency of CPU and GPU hardware units on demand, a usage ratio of allocated memory space, a data input or output flow, a number of images processed or interpreted per second in the video stream, a number of calculation cores used in the CPU and GPU hardware units on demand, etc.

It will be noted that the number of images processed or interpreted per second in the video stream is a parameter than can be both configured (using the n dynamic configurators $16_1, \ldots, 16_i, \ldots, 16_n$) and measured (using the n measurement devices $18_1, \ldots, 18_i, \ldots, 18_n$). Fixing an objective consisting of processing or interpreting a given number of images per second using one of the configurators $16_1, \ldots, 16_i, \ldots, 16_n$ does not necessarily mean that it will be achieved. In particular, this objective can be temporarily hampered by insufficient hardware resources and it is beneficial to be able to measure it.

Thus, by dynamically varying the configuration parameters and regularly measuring the demand for hardware resources, it becomes genuinely possible to automatically optimize processing done by the n tracking devices $14_1, \ldots, 14_i, \ldots, 14_n$ within the limit of available resources.

Video stream portions transmitted to the supplementary reference tracking device $14_{MSTR}$ are selected successively by the collector 12 using a predetermined arbitrary selection algorithmic rule, for example according to a periodic scheduling of the n video cameras $10_1, \ldots, 10_i, \ldots, 10_n$. In the example in FIG. 1, n portions $P_1, \ldots, P_i, \ldots, P_n$ are successively selected and extracted from the n video streams supplied by the n video cameras $10_1, \ldots, 10_i, \ldots, 10_n$. Each is beneficially sufficiently short duration to not constrain the supplementary reference tracking device $14_{MSTR}$ to processing in real time. For example, the duration of each video stream portion may be less than one tenth, or even a hundredth, of the time allowed to the supplementary reference tracking device $14_{MSTR}$ to make its analysis. Thus the latter device, unlike the n tracking devices $14_1, \ldots, 14_i, \ldots, 14_n$, can have higher performance, remote, $\ldots$, hardware resources both in terms of memory and calculation capacity. Therefore it can be considered that the detection and tracking processing done by the supplementary reference tracking device $14_{MSTR}$ is optimal, or at least that its quality and resources levels are better than the n tracking devices $14_1, \ldots, 14_i, \ldots, 14_n$. This is why the results provided by this supplementary reference tracking device $14_{MSTR}$ can be considered to form a reference, without any target detection or tracking error, with which the results output by the n tracking devices $14_1, \ldots, 14_i, \ldots, 14_n$ can be compared, according to the first aspect of this invention.

The adaptive automatic target tracking system in FIG. 1 further comprises a metrics calculator 20 designed in hardware or programmed in software to calculate at least one metric performance value for each of the tracking devices $14_1, \ldots, 14_i, \ldots, 14_n$.

According to the first aspect of this invention, the metrics calculator 20 comprises a first hardware or software module 22 adapted more precisely to calculate a first performance metric value from a comparison on each of the n video stream portions $P_1, \ldots, P_i, \ldots, P_n$, of target tracking results $R_1, \ldots, R_i, \ldots, R_n$ output by the tracking devices $14_1, \ldots, 14_i, \ldots, 14_n$ respectively on the n portions $P_1, \ldots, P_i, \ldots, P_n$ with the target tracking results $S_1, \ldots, S_i, \ldots, S_n$ supplied successively by the supplementary reference tracking device $14_{MSTR}$ on these same n portions $P_1, \ldots, P_i, \ldots, P_n$. The first metric performance value can be expressed in the form of a ratio and can be correlated to a number of interchanged targets or a number of targets not identified by each of the n tracking devices $14_1, \ldots, 14_i, \ldots, 14_n$ when they are compared with the supplementary reference tracking device $14_{MSTR}$.

According to the second aspect of this invention, the metrics calculator 20 comprises a second hardware or software module 24 adapted more precisely to calculate at least one second metric performance value starting from each value representative of demand for hardware resources supplied by the n measurement devices $18_1, \ldots, 18_i, \ldots, 18_n$. As for the measurements given above as examples, it can thus be a fraction of the maximum operating frequency of the CPU and GPU hardware units on demand, a usage ratio of allocated memory space, a fraction of the maximum data input or output flow, a metric of an obtained result related to an objective set in terms of the number of images processed or interpreted per second, a usage ratio of calculation cores used in the CPU and GPU hardware units on demand compared with a maximum allocated number, for each of the n tracking devices $14_1, \ldots, 14_i, \ldots, 14_n$.

The adaptive automatic target tracking system in FIG. 1 further comprises a corrector 26 designed in hardware or programmed in software to recalculate the configuration parameters for the n tracking devices $14_1, \ldots, 14_i, \ldots, 14_n$ starting from the metric values supplied by the metrics calculator 20. In practice, this corrector 26 may have predetermined functions or systems of linear or non-linear equations, a rules motor, an expert system, a neuron networks system, comparators, or any other artificial intelligence system useful for updating configuration parameters of each of the tracking devices $14_1, \ldots, 14_i, \ldots, 14_n$. In particular, it may be a set of rules or laws that have to be observed, such as a law according to which each tracking device $14_1, \ldots, 14_i, \ldots, 14_n$ must process at least five images per second, or a law according to which each tracking device $14_1, \ldots, 14_i, \ldots, 14_n$ must not fail to detect more than 30% of targets.

It may use an individual approach by giving priority to the individual adjustment of each of the n tracking devices $14_1, \ldots, 14_i, \ldots, 14_n$, but also a global approach, giving priority to equitably distributing globally available hardware resources as a function of the different needs of each. It provides its results to the n dynamic configurators $16_1, \ldots, 16_i, \ldots, 16_n$.

The supplementary reference tracking device $14_{MSTR}$, the metrics calculator 20 and the corrector 26 form a hardware or software optimization platform 28 for the system in FIG. 1.

The n results of the n tracking devices $14_1, \ldots, 14_i, \ldots, 14_n$ are supplied to a secondary stage 30 of the adaptive automatic target tracking system in FIG. 1. In a simple embodiment, this secondary stage can be a system output stage, but it can also be a secondary supplementary video stream processing stage.

Figure 2:
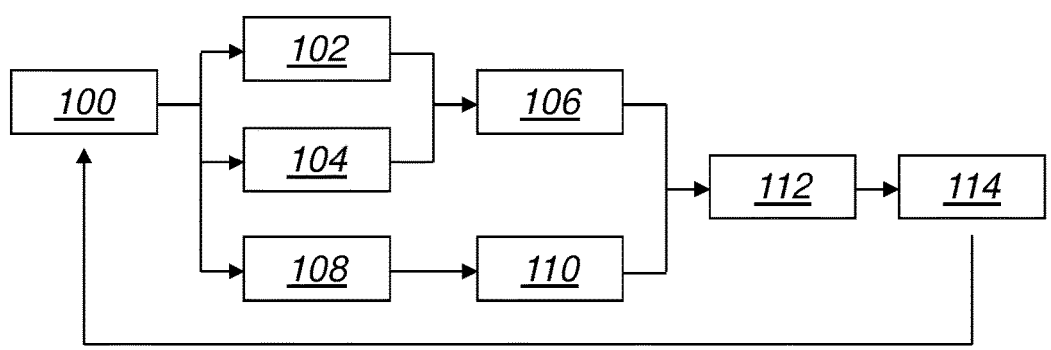
FIG. 2 illustrates the successive steps in an automatic target tracking method implemented by the system in FIG. 1, FIG. 3 diagrammatically represents an example of a first simplified architecture for the system in FIG. 1, and FIG. 4 diagrammatically represents an example of a second shared and decoupled architecture for the system in FIG. 1.

Operation of the system described above will now be described with reference to FIG. 2.

In a first step 100, the collector 12 transmits the n video streams supplied by the n video cameras $10_1, \ldots,$ $10_i, \ldots, 10_n$ to the n tracking devices $14_1, \ldots, 14_i, \ldots, 14_n$ of the primary stage of the system for analysis. During this first step, the collector 12 transmits the n successive video stream portions $P_1, \ldots, P_i, \ldots, P_n$ to the supplementary reference tracking device $14_{MSTR}$ also for analysis.

During the next step 102, each of the n tracking devices $14_1, \ldots, 14_i, \ldots, 14_n$ becomes familiar with its current configuration using its dynamic configurator $16_1, \ldots, 16_i, \ldots, 16_n$, analyses the video stream transmitted to it and sends its results to the secondary stage 30. It also supplies its partial results $R_1, \ldots, R_i, \ldots, R_n$ obtained on the video stream portions $P_1, \ldots, P_i, \ldots, P_n$ to the first module 22 of the metrics calculator 20.

During a step 104 executed in parallel to step 102, the supplementary reference tracking device $14_{MSTR}$ analyses the n successive portions $P_1, \ldots, P_i, \ldots, P_n$ of video stream transmitted to it and outputs its results $S_1, \ldots, S_i, \ldots, S_n$ to the first module 22 of the metrics calculator 20.

Subsequent to steps 102 and 104, the first module 22 of the metrics calculator 20 calculates its above-mentioned metric values and supplies them to the corrector 26 during a step 106.

During a step 108 executed in parallel to steps 102 and 104, each of the n measurement devices $18_1, \ldots, 18_i, \ldots, 18_n$ supplies its measured values to the second module 24 of the metrics calculator 20.

Subsequent to step 108, the second module 24 of the metrics calculator 20 calculates its above-mentioned metric values and supplies them to the corrector 26 during a step 110.

Subsequent to steps 106 and 110, the corrector 26 updates the configuration parameters of then tracking devices $14_1, \ldots, 14_i, \ldots, 14_n$ as indicated previously during a step 112. It transmits updated values to the dynamic configurators $16_1, \ldots, 16_i, \ldots, 16_n$.

During a last step 114, each dynamic configurator $16_1, \ldots, 16_i, \ldots, 16_n$ acts on each tracking device $14_1, \ldots, 14_i, \ldots, 14_n$ respectively, as indicated above.

Steps 100 to 114 are beneficially executed continuously, all the time that the system is in operation.

Concerning the metrics calculator 20, as a non-limitative specific example:
- its second module 24 can receive, as an input, a list of time-date values (dates, times, etc.) respectively supplied by the n measurement devices $18_1, \ldots, 18_i, \ldots, 18_n$, at which the n tracking devices $14_1, \ldots, 14_i, \ldots, 14_n$ start and end their processing cycles for a given image,
- its first module 22 can receive, as an input, a list containing detected targets with associated spatial coordinates for each of the n tracking devices $14_1, \ldots, 14_i, \ldots, 14_n$ and a corresponding reference list containing detected targets with associated spatial coordinates for the supplementary reference tracking device $14_{MSTR}$.

Starting from these input data:
- the second module 24 can calculate a real operating frequency of each of n tracking devices $14_1, \ldots, 14_i, \ldots, 14_n$, in other words the number of images actually processed or interpreted per second in the video stream by each tracking device,
- the first module 22 can calculate a number of targets lost in a scene of the video stream by each of the n tracking devices $14_1, \ldots, 14_i, \ldots, 14_n$, by comparing the size of the reference list mentioned above with the size of each of the lists of detected targets supplied by the n tracking devices $14_1, \ldots, 14_i, \ldots, 14_n$, and
- the first module 22 can calculate a number of targets badly localized in a scene of the video stream by each of the n tracking devices $14_1, \ldots, 14_i, \ldots, 14_n$, by comparing the spatial coordinates of the reference list mentioned above with each of the spatial coordinates of the lists of detected targets supplied by the n tracking devices $14_1, \ldots, 14_i, \ldots, 14_n$: for example for each tracking device, all targets detected by this tracking device and also by the supplementary reference tracking device $14_{MSTR}$ for which the localizations are different by more than a certain percentage (for example 5%) of the size of images are counted.

Concerning the corrector 26, as a non-limitative specific example, its input may receive the results of the above-mentioned calculations made by the first and second modules 22, 24 and a set quality, in other words a minimum quality to be maintained.

Starting from these input data, it may, among other options, regulate the operating frequency of each of the n tracking devices $14_1, \ldots, 14_i, \ldots, 14_n$, called "set frequency" or number of images to be processed or interpreted per second, by application of rules such as the following rules:
- if the number of lost targets added to the number of badly localized targets is higher than the set quality, for example increased by a predetermined tolerance value, then the set frequency of the tracking device considered should be increased, and the global distribution of hardware resources between the n tracking devices $14_1, \ldots, 14_i, \ldots, 14_n$ may need to be revised,
- if the number of lost targets added to the number of badly localized targets is lower than the set quality, for example reduced by the predetermined tolerance value, then the set frequency of the tracking device considered should be reduced, and the global distribution of hardware resources between the n tracking devices $14_1, \ldots, 14_i, \ldots, 14_n$ may need to be revised, As a specific non-limitative example, the revision of the global distribution of hardware resources may apply the following rules:
- the n tracking devices $14_1, \ldots, 14_i, \ldots, 14_n$ are classified by quality level: for example level 4 if the number of lost targets added to the number of badly localized targets is between 0 and 4, level 3 if the number of lost targets added to the number of badly localized targets is between 5 and 8, level 2 if the number of lost targets added to the number of badly localized targets is between 9 and 12, and level 1 if the number of lost targets added to the number of badly localized targets is higher than 12,
- if two tracking devices have the same quality level, then each has the right to an equally high operating frequency,
- if the quality level of one tracking device is lower than another, then it has the right to a higher operating frequency than the other, and
- if the quality level of one tracking device is higher than another, then it has the right to a lower operating frequency than the other.

Figure 3:
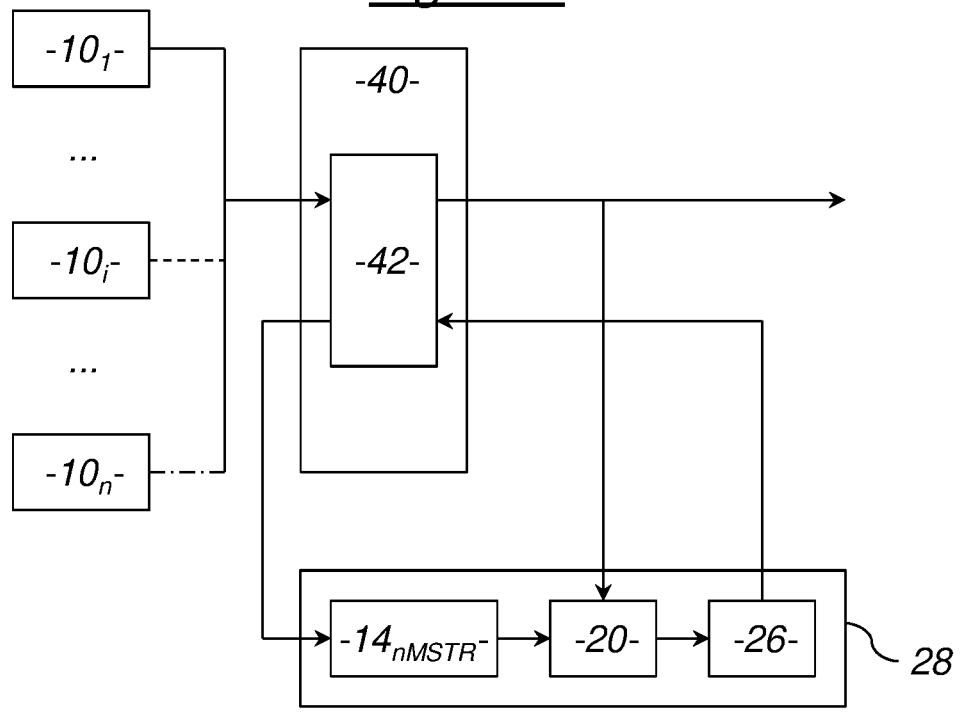

A first example of a simple implementation of the system in FIG. 1 is illustrated on FIG. 3. This architecture has components for which the control and cost make implementation easy.

A tracking server 40, for example forming a classical computer with an operating system such as Linux (registered trademark) and a network access card, comprises a set 42 of shared tracking devices. This set 42 receives video streams from the n video cameras $10_1, \ldots, 10_i, \ldots, 10_n$ that can be in the form of IP (Internet Protocol) cameras or cameras conforming with the Wi-Fi standard protocol transmitting their video streams through the network. The tracking devices are simply software components capable of executing several target detection and tracking algorithms, for example implemented in the C++ or Python (registered trademark) programming language with the assistance of the OpenCV (registered trademark) software library.

The optimization platform 28 is also implemented in a classical computer with access to the network. The supplementary reference tracking device $14_{MSTR}$, the metrics calculator 20 and the corrector 26 that compose it are also software components, for example implemented in the C++ or Python (registered trademark) programming language with the assistance of the OpenCV (registered trademark) software library. In particular, the metrics calculator 20 and the corrector 26 can be programmed using algorithms according to prior art to calculate metrics and corrections based on simple equations tested on test data for regulation. Also in this example, the supplementary reference tracking device $14_{MSTR}$ receives the portions of video streams from the set 42 of shared tracking devices.

Figure 4:
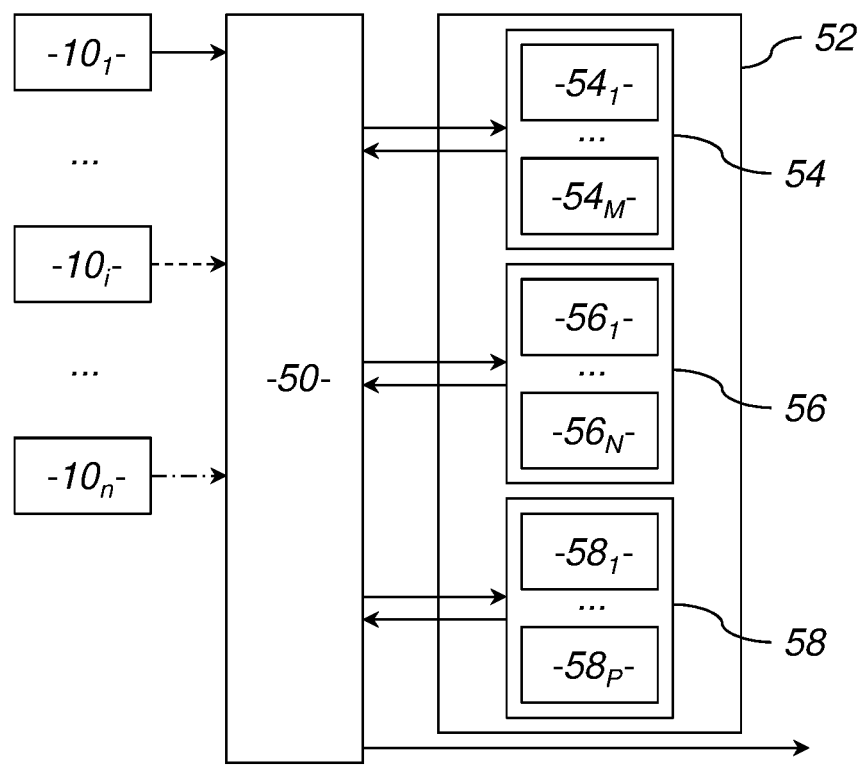

A second more complex but more flexible implementation of the system in FIG. 1 is illustrated on FIG. 4. This architecture enables sharing and decoupling of all its components, so as to envisage an industrial implementation with the capacity to process a very large number of video cameras. In particular, the effect of scale or scalability in this type of architecture can create a considerable improvement in the efficiency of the system by benefiting from multiplying the gains by video cameras and the use of inexpensive calculation units shared for optimization through calculations of metrics and corrections.

A first component 50, acting as a distributor and a communication bus, receives video streams from the n video cameras $10_1, \ldots, 10_i, \ldots, 10_n$. It may be a message broker type component such as Apache ActiveMQ (registered trademark) or WebSphere (registered trademark), or an ESB ("Enterprise Service Bus") such as Blueway (registered trademark) or Talend (registered trademark).

A second component 52 connected to the first component 50, has an IaaS ("Infrastructure as a Service") infrastructure on demand type evolutive architecture, by which it is possible to dynamically allocate calculation units such as virtual machines to adapt to the demand for resources. This second component 52 may be implemented in private IaaS based on VMware components (registered trademark) or in public IaaS based on services such as Amazon EC2 (registered trademark). It comprises a tracking module 54 with M tracking devices $54_1, \ldots, 54_M$, a reference tracking module 56 with N supplementary reference tracking devices $56_1, \ldots, 56_N$ and a regulation module 58 with P regulators $58_1, \ldots, 58_P$ each comprising a metrics calculator and a corrector. These three modules 54, 56 and 58 are deployed on a virtual machine.

Data exchanges between the first and second components 50 and 52 take place as follows:
- transmission of video streams and corrected configuration parameters, from the first component 50 to the tracking module 54 of the second component 52,
- transmission of video tracking results, from the tracking module 54 of the second component 52 to the first component 50,
- transmission of selected portions of video streams, from the first component 50 to the reference tracking module 56 of the second component 52,
- transmission of reference tracking results on selected portions of video streams, from the reference tracking module 56 of the second component 52 to the first component 50,
- transmission of video tracking results and reference tracking results, from the first component 50 to the regulation module 58 of the second component 52,
- exchange of metric values between regulators of the regulation module 58 of the second component 52 passing through the first component 50,
- transmission of corrected configuration parameters, from the regulation module 58 of the second component 52 to the first component 50,
- transmission of video tracking results from the first component 50 to a secondary or output stage.

The distribution of tasks within each of the modules 54, 56 and 58 is done in a decoupled manner depending on the availability and the resources of their components $54_1, \ldots, 54_M, 56_1, \ldots, 56_N$ and $58_1, \ldots, 58_P$.

As mentioned above, the systems illustrated on FIGS. 1, 3 and 4 can be used in computer devices such as classical computers comprising processors associated with memories for the storage of data files and computer programs. Tracking and regulation devices (by calculation of metrics, correction and configuration) can be implemented in these computers in the form of computer programs or different functions of the same computer program. These functions could also be at least partly micro-programmed or microwired in dedicated integrated circuits. Thus as a variant, the computer devices implementing FIGS. 1, 3 and 4 could be replaced by electronic devices composed solely of digital circuits (with no computer program) to perform the same actions.

It clearly appears that an adaptive system for automatic target tracking in at least one video stream like those described above can genuinely automatically optimize its processing within the limit of its resources and detect risk situations much more reliably. The resulting optimization of hardware resources largely compensates the extra cost generated by addition of the reference tracking device(s) and devices for measuring the demand for hardware resources.

In particular, it becomes possible to minimize the hardware occupancy ratio for the global system including all tracking devices and to maximize the tracking quality for each device: the regulation chain by calculation of metrics and corrections is indeed beneficially used regularly, for example periodically, for each tracking device of the primary stage so that operation thereof can be corrected regularly as a function of objectives set for the system.

The supplementary reference tracking device(s) is (are) not affected by real time processing constraints because the frequency and latency of regulation loops can vary without causing any sudden deterioration to performance of the system. Thus, each supplementary reference tracking device can be deployed on physical components shared with other functions of the system, in a generally less expensive architecture, relative to the total cost per unit operation, than real time oriented architectures.

The global cost of the system depends on the complexity of scenes and the expected quality of tracking devices. The following reasoning shows that this invention reduces expenditure of the system, for a set tracking quality. A similar reasoning may be adopted by which this invention improves the tracking quality, for a given expenditure.

Note:
$ct_{regulation\text{-}for\text{-}i}$ the quantity of hardware resources used for the regulation (metric and correction calculations) of the tracking device $14_i$, $ct_{track\text{-}master\text{-}tracker\text{-}i}$, $ct_{calculate\text{-}metrics\text{-}i}$, $ct_{corrector\text{-}i}$ the quantity of hardware resources used for evaluation by the supplementary reference tracking device $14_{MSTR}$ of video stream portions from camera $10_i$, the evaluation of resource consumption by tracking device $14_i$, the correction calculation to be applied to the tracking device $14_i$, $Ct_{ave\text{-}unit\text{-}tracker}$ the average quantity of hardware resources requested by a tracking device (average calculated on all tracking devices $14_1$ to $14_n$), $Ct_{ave\text{-}master\text{-}unit\text{-}tracker}$ the quantity of hardware resources required for evaluation by the supplementary reference tracking device $14_{MSTR}$ of video stream portions from a camera averaged over a period and for all tracking devices, $Ct_{optimized\text{-}ave\text{-}unit\text{-}tracker}$ the average quantity of hardware resources requested by a tracking device when the previously described regulation is used (average calculated on all tracking devices $14_1$ to $14_n$), When the system benefits from the first and second aspects of this invention:

$$ct_{optimized\text{-}primary\text{-}trackers\text{-}stage} = \sum_{i=1}^{n} \left(ct_{unit\text{-}tracker\text{-}i} + ct_{regulation\text{-}for\text{-}i}\right)$$

and $$ct_{regulation\text{-}for\text{-}i} = ct_{track\text{-}master\text{-}tracker\text{-}i} + ct_{calculate\text{-}metrics\text{-}i} + ct_{corrector\text{-}i}$$

For a simple implementation of the regulation:

$$ct_{regulation\text{-}for\text{-}i} \approx ct_{track\text{-}master\text{-}tracker\text{-}i}$$

$$ct_{optimized\text{-}primary\text{-}trackers\text{-}stage} = \sum_{i=1}^{n} \left(ct_{unit\text{-}tracker\text{-}i} + ct_{track\text{-}master\text{-}tracker\text{-}i}\right)$$

$$ct_{optimized\text{-}primary\text{-}trackers\text{-}stage} =$$
$$n \times \left(ct_{optimized\text{-}ave\text{-}unit\text{-}tracker} + ct_{ave\text{-}master\text{-}unit\text{-}tracker}\right)$$

When the system does not benefit from the first and second aspects of this invention:

$$ct_{primary\text{-}trackers\text{-}stage} = n \times ct_{ave\text{-}unit\text{-}tracker}$$

Hence a gain G:

$$G = ct_{primary\text{-}trackers\text{-}stage} - ct_{optimized\text{-}primary\text{-}trackers\text{-}stage}$$

$$gain = n \times (ct_{ave\text{-}unit\text{-}tracker} - ct_{optimized\text{-}ave\text{-}unit\text{-}tracker} - ct_{ave\text{-}master\text{-}unit\text{-}tracker})$$

Therefore this invention offers a better performance when the average optimization for a tracking device resulting from the regulation is higher than average expenses induced by the supplementary reference tracking device for a tracking device:

$$ct_{ave\text{-}unit\text{-}tracker} - ct_{optimized\text{-}ave\text{-}unit\text{-}tracker} > ct_{ave\text{-}master\text{-}unit\text{-}tracker}$$

It will also be noted that the invention is not restricted to the embodiments described above.

In particular, the embodiments described above combine the benefits of the first and second aspects of this invention.

But it should be noted that these two aspects are independent of each other. A system according to the first aspect of this invention may not include measurement devices and calculations of the second metric values. A system according to the second aspect of this invention may not include the supplementary reference tracking device(s) and calculations of the first metric values.

It will more generally be clear to an expert in the field that various modifications can be made to the embodiments described above, making use of the information disclosed above. The terms used in the detailed presentation of the invention given above must not be interpreted as limiting the invention to the embodiments presented in this description, but must be interpreted to include all equivalents that can be designed by those skilled in the art applying their own general knowledge to implementation of the information disclosed above.

The invention claimed is:

1. An adaptive system for automatic tracking of a target in at least one video stream, comprising:
    at least one dynamically configurable tracking device, receiving said at least one video stream, adapted for detection and automatic tracking of at least one target by analysis of said at least one video stream,
    a calculator to determine at least one metric performance value from a target tracking result provided by said at least one tracking device,
    a corrector of at least one configuration parameter of said least one tracking device as a function of said at least one metric performance value, said corrector configured to correct said at least one configuration parameter, and
    at least one dynamic configurator of said at least one tracking device by application of said at least one configuration parameter that has been corrected,
    at least one supplementary reference tracking device, receiving a portion of said at least one video stream, wherein the calculator is adapted to calculate said at least one metric performance value based on a comparison on said portion of said at least one video stream, of the target tracking result supplied by said at least one tracking device and a reference tracking result supplied by said at least one supplementary reference tracking device,
    wherein the calculator is adapted to calculate said at least one metric performance value based on a first number of unidentified or lost targets for each tracking device, the first number being calculated from the comparison on said portion of said at least one video stream, of the target tracking result supplied by said at least one tracking device and the reference tracking result supplied by said at least one supplementary reference tracking device,
    wherein the calculator is adapted to calculate said at least one metric performance value based on a second number of interchanged or badly localized targets for each tracking device, the second number being calculated from the comparison on said portion of said at least one video stream, of the target tracking result supplied by said at least one tracking device and the reference tracking result supplied by said at least one supplementary reference tracking device,
    wherein the corrector is adapted to regulate a set frequency of said at least one tracking device by applying one or more rules, said one or more rules comprising:
    if the first number of unidentified or lost targets added to the second number of interchanged or badly localized targets is higher than a predetermined set quality, for example increased by a predetermined tolerance value, then the set frequency of said at least one tracking device is increased, and if the first number of unidentified or lost targets added to the second number of interchanged or badly localized targets is lower than the predetermined set quality, for example reduced by the predetermined tolerance value, then the set frequency of said at least one tracking device is reduced.

2. The adaptive system for automatic tracking of a target according to claim 1, further comprising at least one video capture device connected in data transmission to said at least one tracking device and to said at least one supplementary reference tracking device, for a respective supply of said at least one video stream and said portion of said at least one video stream.

3. The adaptive system for automatic tracking of a target according to claim 1, wherein each tracking device is configurable using at least one of the configuration parameters of the set composed of:

a number of images to be processed or interpreted per second in said at least one video stream, an image resolution, and a maximum number of targets to be detected and tracked in said at least one video stream.

4. The adaptive automatic target tracking system according to claim 1, comprising several tracking devices, simultaneously receiving respectively several video streams.

5. The adaptive automatic target tracking system according to claim 1, wherein each tracking device is adapted for detection and simultaneous automatic tracking of several targets by analysis of the video stream that it receives.

6. An adaptive method for automatic tracking of a target in at least one video stream, comprising:

analyzing said at least one video stream using at least one dynamically configurable tracking device adapted for detection and automatic tracking of at least one target in said at least one video stream, calculating, with a calculator, at least one metric performance value from a target tracking result provided by said at least one tracking device, correcting, with a corrector, at least one configuration parameter of said least one tracking device as a function of said at least one metric performance value, dynamic configuring said at least one tracking device by application of said at least one corrected configuration parameter, and supplying a portion of said at least one video stream to at least one supplementary reference tracking device and wherein the calculation of said at least one metric performance value is based on a comparison, on said portion of said at least one video stream, of the target tracking result supplied by said at least one tracking device and a reference tracking result supplied by said at least one supplementary reference tracking device, wherein the calculator is adapted to calculate said at least one metric performance value based on a first number of unidentified or lost targets for each tracking device, the first number being calculated from the comparison on said portion of said at least one video stream, of the target tracking result supplied by said at least one tracking device and the reference tracking result supplied by said at least one supplementary reference tracking device, wherein the calculator is adapted to calculate said at least one metric performance value based on a second number of interchanged or badly localized targets for each tracking device, the second number being calculated from the comparison on said portion of said at least one video stream, of the target tracking result supplied by said at least one tracking device and the reference tracking result supplied by said at least one supplementary reference tracking device, wherein the corrector is adapted to regulate a set frequency of said at least one tracking device by applying one or more rules, said one or more rules comprising:

if the first number of unidentified or lost targets added to the second number of interchanged or badly localized targets is higher than a predetermined set quality, for example increased by a predetermined tolerance value, then the set frequency of said at least one tracking device is increased, and if the first number of unidentified or lost targets added to the second number of interchanged or badly localized targets is lower than the predetermined set quality, for example reduced by the predetermined tolerance value, then the set frequency of said at least one tracking device is reduced.

7. A non-transitory computer readable medium including a program comprising machine readable instructions for executing steps in an adaptive method for automatic tracking of a target in at least one video stream, when said program is run on a computer, said method comprising analyzing said at least one video stream using at least one dynamically configurable tracking device adapted for detection and automatic tracking of at least one target in said at least one video stream, calculating, with a calculator, at least one metric performance value from a target tracking result provided by said at least one tracking device, correcting, with a corrector, at least one configuration parameter of said least one tracking device as a function of said at least one metric performance value, dynamic configuring said at least one tracking device by application of said at least one corrected configuration parameter, and supplying a portion of said at least one video stream to at least one supplementary reference tracking device and wherein the calculation of said at least one metric performance value is based on a comparison, on said portion of said at least one video stream, of the target tracking result supplied by said at least one tracking device and a reference tracking result supplied by said at least one supplementary reference tracking device, wherein the calculator is adapted to calculate said at least one metric performance value based on a first number of unidentified or lost targets for each tracking device, the first number being calculated from the comparison on said portion of said at least one video stream, of the target tracking result supplied by said at least one tracking device and the reference tracking result supplied by said at least one supplementary reference tracking device, wherein the calculator is adapted to calculate said at least one metric performance value based on a second number of interchanged or badly localized targets for each tracking device, the second number being calculated from the comparison on said portion of said at least one video stream, of the target tracking result supplied by said at least one tracking device and the reference tracking result supplied by said at least one supplementary reference tracking device, wherein the corrector is adapted to regulate a set frequency of said at least one tracking device by applying one or more rules, said one or more rules comprising:
  if the first number of unidentified or lost targets added to the second number of interchanged or badly localized targets is higher than a predetermined set quality, for example increased by a predetermined tolerance value, then the set frequency of said at least one tracking device is increased, and
  if the first number of unidentified or lost targets added to the second number of interchanged or badly localized targets is lower than the predetermined set quality, for example reduced by the predetermined tolerance value, then the set frequency of said at least one tracking device is reduced.

* * * * *